US012151604B2

(12) United States Patent
Tomoeda et al.

(10) Patent No.: US 12,151,604 B2
(45) Date of Patent: Nov. 26, 2024

(54) LIGHT-DISTRIBUTION CONTROL APPARATUS

(71) Applicant: SUBARU CORPORATION, Tokyo (JP)

(72) Inventors: Yu Tomoeda, Tokyo (JP); Kazuaki Uryu, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/413,982

(22) Filed: Jan. 16, 2024

(65) Prior Publication Data

US 2024/0253555 A1    Aug. 1, 2024

(30) Foreign Application Priority Data

Jan. 31, 2023  (JP) .................... 2023-013196

(51) Int. Cl.
*B60Q 1/00*      (2006.01)
*B60Q 1/115*     (2006.01)

(52) U.S. Cl.
CPC ........ *B60Q 1/115* (2013.01); *B60Q 2300/114* (2013.01); *B60Q 2300/132* (2013.01); *B60Q 2300/324* (2013.01); *B60Q 2300/45* (2013.01)

(58) Field of Classification Search
CPC .............. B60Q 1/115; B60Q 2300/114; B60Q 2300/132; B60Q 2300/324; B60Q 2300/45
See application file for complete search history.

(56) References Cited

U.S. PATENT DOCUMENTS

| 2018/0180243 A1* | 6/2018 | Na ......................... F21S 41/68 |
| 2021/0213869 A1* | 7/2021 | Martin .................... B60Q 1/085 |
| 2024/0124084 A1* | 4/2024 | Kwong ............... B62J 45/4151 |

FOREIGN PATENT DOCUMENTS

| JP | 2009-154754 A | 7/2009 | |
| WO | WO-2019041623 A1 * | 3/2019 | ............... B60Q 1/08 |

* cited by examiner

*Primary Examiner* — Gerald J Sufleta, II
(74) *Attorney, Agent, or Firm* — Rimon P.C.

(57) ABSTRACT

A light-distribution control apparatus includes a light-distribution changer configured to change distribution of light that a headlamp of the vehicle emits toward a region in front of the vehicle, a data acquirer, an attitude sensor, and a brake sensor, a light-distribution control processor. The light-distribution control is configured to control the light-distribution changer based on one or more pieces of the data acquired from the data acquirer, the attitude data acquired from the attitude sensor, and the internal pressure data acquired from the brake sensor. The light-distribution control processor is configured to control the light-distribution changer based on the internal pressure data.

6 Claims, 10 Drawing Sheets

FIG. 5

| Determination by light-distribution control processor | Brake mode | NO BRAKING | NORMAL BRAKING | | | NP | SUDDEN BRAKING | | | EP | EMERGENCY BRAKING | | | ... |
|---|---|---|---|---|---|---|---|---|---|---|---|---|---|---|
| | Internal pressure data on brake | 0 | 10 | 20 | 30 | 40 | 50 | 60 | 70 | 80 | 90 | 100 | 110 | ... |
| Data acquired by light-distribution control processor | Data from data acquirer | — | ACQUIRE | ACQUIRE | ACQUIRE | ACQUIRE | ACQUIRE | ACQUIRE | ACQUIRE | — | — | — | — | ... |
| | Data from attitude sensor | — | ACQUIRE | ACQUIRE | ACQUIRE | ACQUIRE | ACQUIRE | ACQUIRE | ACQUIRE | — | — | — | — | ... |
| | Data from brake sensor | — | — | — | — | — | ACQUIRE | ACQUIRE | ACQUIRE | ACQUIRE | ACQUIRE | ACQUIRE | ACQUIRE | ... |
| Light-distribution control value | Reference light-distribution control value | — | ACQUIRE | ACQUIRE | ACQUIRE | ACQUIRE | — | — | — | — | — | — | — | ... |
| | Traveling light-distribution control value | ACQUIRE | — | — | — | — | — | — | — | — | — | — | — | ... |

LIGHT-DISTRIBUTION CONTROL APPARATUS

CROSS-REFERENCE TO RELATED APPLICATIONS

The present application claims priority from Japanese Patent Application No. 2023-013196 filed on Jan. 31, 2023, the entire contents of which are hereby incorporated by reference.

BACKGROUND

The disclosure relates to a light-distribution control apparatus.

A vehicle has been equipped with an auto light function that turns on a headlamp automatically when brightness outside the vehicle decreases to a predetermined value or lower. Accordingly, to prevent an occupant of an oncoming vehicle or pedestrians from being dazzled when the headlamp is turned on, light-distribution control of adjusting an irradiation angle of the headlamp is performed in some vehicles.

For example, Japanese Unexamined Patent Application Publication No. 2009-154754 discloses an optical-axis adjusting apparatus, or a light-distribution control apparatus, for a vehicle headlamp. The apparatus includes the vehicle headlamp, a driver, a vehicle height sensor, and a processor. The vehicle headlamp is supported on a front part of a vehicle body so that an optical axis of the vehicle headlamp is vertically swingable. The driver vertically swings the optical axis of the vehicle headlamp. The vehicle height sensor detects a height of the vehicle body. The processor calculates an inclination of the vehicle body based on a detection signal from the vehicle height sensor, and drives and controls the driver to cancel out the inclination. When an integrated value of any piece of vehicle data is greater than or equal to a predetermined value upon starting or deceleration of the vehicle, the processor drives and controls the driver stepwise in accordance with the vehicle data to thereby perform specific correction control of swinging the optical axis of the vehicle headlamp stepwise to achieve predetermined angles.

SUMMARY

An aspect of the disclosure provides a light-distribution control apparatus to be applied to a vehicle. The light-distribution control apparatus includes a light-distribution changer, a data acquirer, an attitude sensor, a brake sensor, and a light-distribution control processor. The light-distribution changer is configured to change distribution of light that a headlamp of the vehicle emits toward a region in front of the vehicle. The data acquirer is configured to recognize a traveling state or a traveling environment of the vehicle and acquire data on an object approaching the vehicle and on inclination of a road surface on which the vehicle is traveling. The attitude sensor is configured to acquire attitude data on the vehicle. The brake sensor is configured to acquire internal pressure data on a brake of the vehicle. The light-distribution control processor is configured to control the light-distribution changer based on one or more pieces of the data acquired from the data acquirer, the attitude data acquired from the attitude sensor, and the internal pressure data acquired from the brake sensor. The light-distribution control processor is configured to: when the internal pressure data is less than or equal to a first predetermined value, determine that the brake is in a brake mode of normal braking and control the light-distribution changer based on the data acquired from the data acquirer and the attitude data; when the internal pressure data is greater than the first predetermined value and less than a second predetermined value, determine that the brake is in a brake mode of sudden braking and control the light-distribution changer based on the data acquired from the data acquirer, the attitude data, and the internal pressure data; and when the internal pressure data is greater than or equal to the second predetermined value, determine that the brake is in a brake mode of emergency braking and control the light-distribution changer based on the internal pressure data.

An aspect of the disclosure provides a light-distribution control apparatus to be applied to a vehicle. The light-distribution control apparatus includes an attitude sensor, a brake sensor, and circuitry. The attitude sensor is configured to acquire attitude data on the vehicle. The brake sensor is configured to acquire internal pressure data on a brake of the vehicle. The circuitry is configured to: change distribution of light that a headlamp of the vehicle emits toward a region in front of the vehicle; recognize a traveling state or a traveling environment of the vehicle and acquire data on an object approaching the vehicle and on inclination of a road surface on which the vehicle is traveling; and control the distribution of the light based on one or more pieces of the data on the object and on the inclination, the attitude data acquired from the attitude sensor, and the internal pressure data acquired from the brake sensor. The circuitry is configured to: when the internal pressure data is less than or equal to a first predetermined value, determine that the brake is in a brake mode of normal braking and control the distribution of the light based on the data on the object and on the inclination and the attitude data; when the internal pressure data is greater than the first predetermined value and less than a second predetermined value, determine that the brake is in a brake mode of sudden braking and control the distribution of the light based on the data on the object and on the inclination, the attitude data, and the internal pressure data; and when the internal pressure data is greater than or equal to the second predetermined value, determine that the brake is in a brake mode of emergency braking and control the distribution of the light based on the internal pressure data.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 5 is a diagram illustrating acquisition of sensor data performed by the light-distribution control ECU illustrated in FIG. 4.

DETAILED DESCRIPTION

Figure 1:
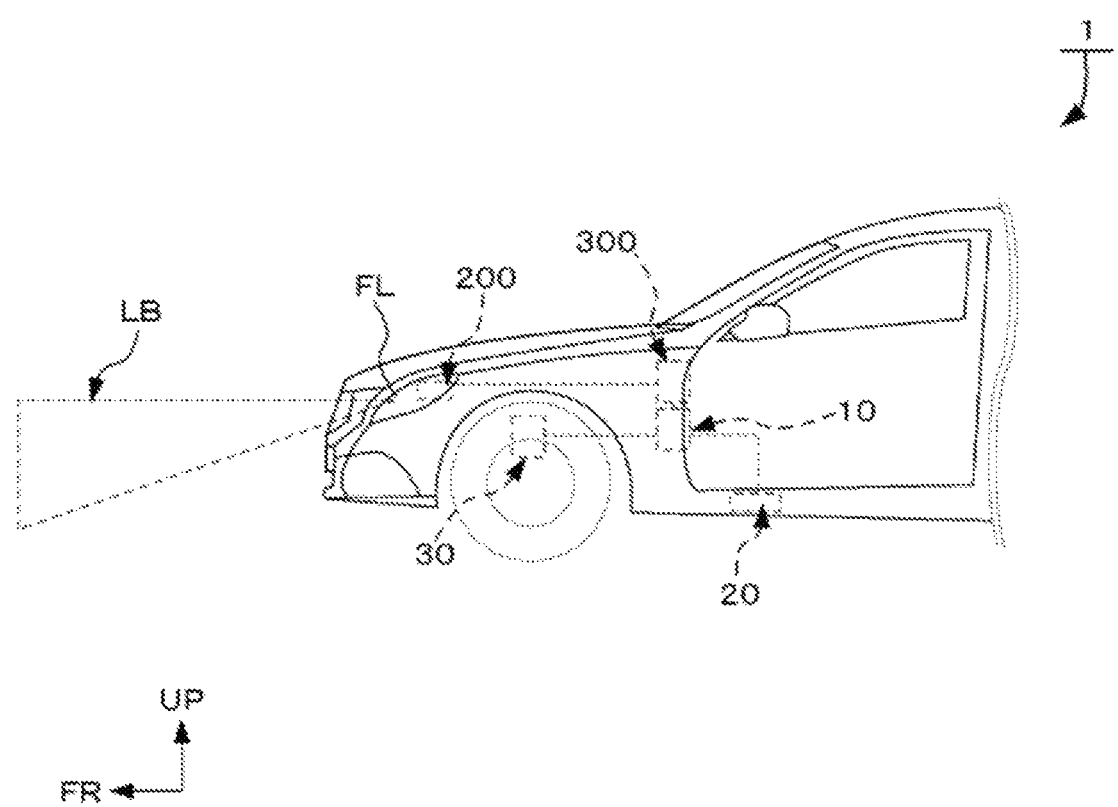
FIG. 1 is a layout diagram of a light-distribution control apparatus according to one example embodiment of the disclosure in a vehicle.

To perform various kinds of detection including detection of an inclination of a road surface on which a vehicle is traveling and detection of an attitude of the vehicle, various sensors are installed at respective positions in the vehicle that are effective for performing the detection. The sensors are contained in respective sensor housings to prevent an occurrence of erroneous detection due to adhesion of dust, water, or any other foreign matters. A processor included in a light-distribution control apparatus performs light-distribution control based on data transmitted from the sensors in a state where the sensors are contained in the respective sensor housings.

However, when the vehicle undergoes a sudden operation such as sudden braking or sudden spinning, distortion can occur on a vehicle housing or on the sensor housings, for example. In such a case, the sensors will transmit data in the presence of the distortion occurring on the housings. In other words, when the vehicle undergoes the sudden operation such as sudden braking or sudden spinning, each sensor will add data on the distortion occurring on the sensor housing to data on inclination of the vehicle caused by the sudden operation, and will transmit the resulting data.

Accordingly, upon recovery of an original attitude of the vehicle, the processor will operate to restore the light-distribution position to a previous position based on the data including the distortion data. As a result, the light-distribution position can become misaligned with respect to that before the sudden operation performed on the vehicle.

It is desirable to provide a light-distribution control apparatus that makes it possible to reduce an occurrence of misalignment of the light-distribution position of a headlamp of a vehicle.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

With reference to FIGS. 1 to 10, a description will be given of a vehicle to which a light-distribution control apparatus 1 according to an example embodiment of the disclosure is applied. It should be noted that an arrow FR illustrated in any drawing indicates a front side of the vehicle illustrated in FIG. 1, an arrow UP indicates an upper side in a front view, and an arrow LH indicates a left side in the front view. In the following, an up-down direction, a front-rear direction, and a left-right direction respectively denote an up-down direction in the front view, a front-rear direction in the front view, and a left-right direction in the front view when the description is made using the up-down direction, the front-rear direction, and the left-right direction, unless otherwise specified.

Example Embodiment

Reference is made to FIGS. 1 to 6 to describe a configuration of the light-distribution control apparatus 1 according to the example embodiment to be applied to the vehicle.

Configuration of Light-Distribution Control Apparatus

Figure 2:
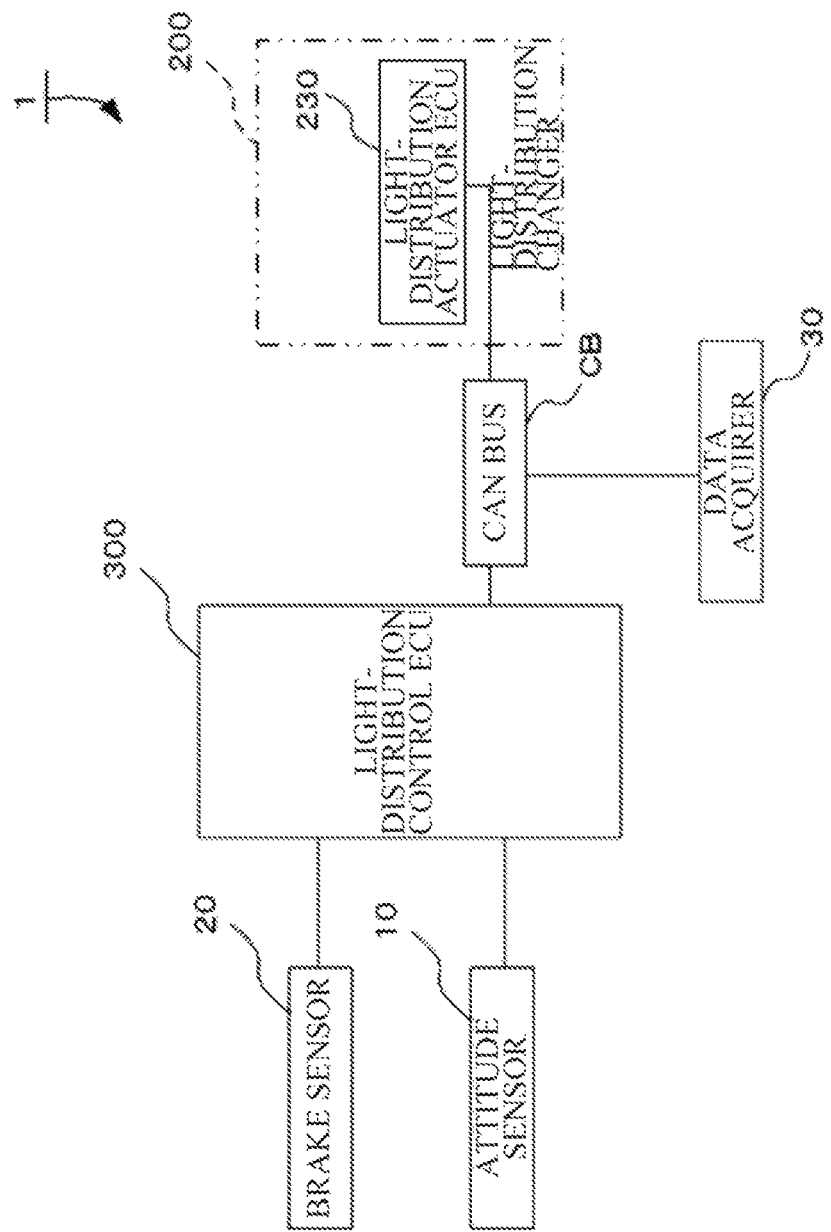
FIG. 2 is a configuration diagram of the light-distribution control apparatus illustrated in FIG. 1.

As illustrated in FIG. 1, the light-distribution control apparatus 1 may be disposed in the vehicle and may control a direction of forward irradiation light LB that a headlamp FL of the vehicle emits toward a region in front of the vehicle. As illustrated in FIGS. 1 and 2, the light-distribution control apparatus 1 may include an attitude sensor 10, a brake sensor 20, a data acquirer 30, a light-distribution changer 200, and a light-distribution control ECU 300.

The attitude sensor 10 acquires attitude data on the vehicle. The attitude sensor 10 may transmit the attitude data to the data acquirer 30 and the light-distribution control ECU 300. The attitude sensor 10 may acquire data on, for example, inclinations of the vehicle in the front-rear direction and the left-right direction or a spinning state of the vehicle by means of various sensors including, for example, a height sensor provided at a rear wheel and an acceleration sensor provided in a middle portion of the vehicle, and may transmit the acquired data to the data acquirer 30 or the light-distribution control ECU 300.

The brake sensor 20 may be provided at a brake device of each wheel. The brake sensor 20 acquires internal pressure data on a brake of the vehicle. The brake sensor 20 may acquire the internal pressure data on the brake as an amount of pressing performed on a brake pedal by a driver who drives the vehicle, and may transmit the acquired internal pressure data on the brake to the data acquirer 30 and the light-distribution control ECU 300.

The data acquirer 30 may recognize a traveling environment of the vehicle to identify inclination of an object approaching the vehicle and of a road surface on which the vehicle is traveling. The data acquirer 30 may acquire data indicating any of driving operations performed on the vehicle including, for example, acceleration, deceleration, and steering, based on any of data including, for example, the data transmitted from each of the attitude sensor 10 and the brake sensor 20 and data transmitted from each of unillustrated sensors including an accelerator sensor, a shift sensor, and a steering angle sensor. Further, the data acquirer 30 may acquire data indicating a situation outside the vehicle by means of, for example, any of unillustrated devices including a millimeter wave radar, an infrared sensor, an imaging device, and a temperature sensor. Examples of the data indicating the situation outside the vehicle may include a road surface gradient, a road surface state, weather conditions, a wind speed, and an outside air temperature.

The data acquired by the data acquirer 30 may be transmitted to the light-distribution changer 200 and the light-distribution control ECU 300 via a control area network (CAN) bus CB that transmits CAN communications. The data acquirer 30 may receive data from the light-distribution changer 200 and the light-distribution control ECU 300 via the CAN bus CB.

Configuration of Light-Distribution Changer 200

Figure 3:
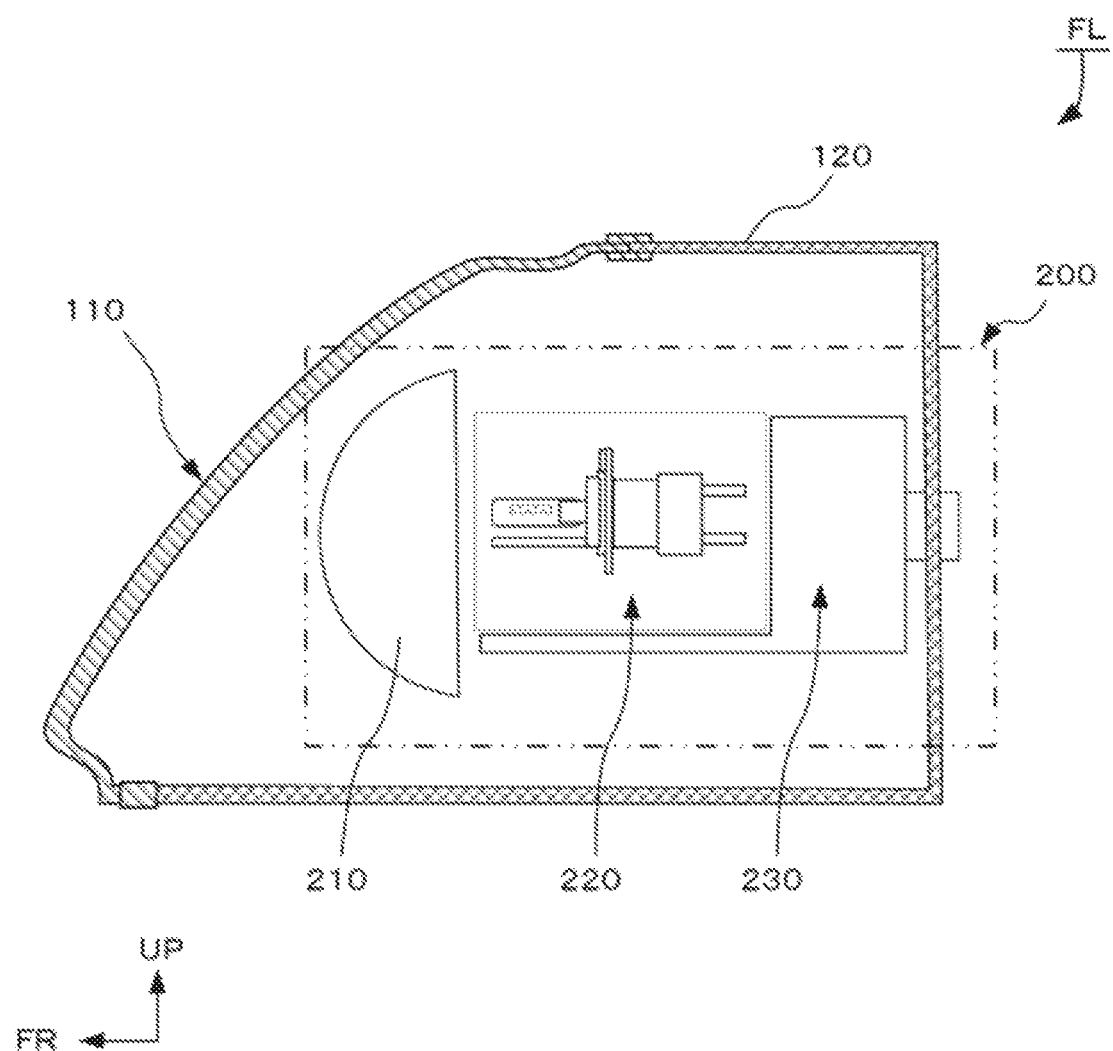
FIG. 3 is a cross-sectional view of a light-distribution changer of the light-distribution control apparatus illustrated in FIG. 1.

The light-distribution changer 200 may control the direction of the forward irradiation light LB that the headlamp FL of the vehicle emits toward the region in front of the vehicle. As illustrated in FIG. 3, the light-distribution changer 200 may include an inner lens 210, a light source 220, and a light-distribution actuator ECU 230. The light-distribution changer 200 may be provided in a space surrounded by an outer lens 110 and a cover 120 of the headlamp FL.

The outer lens 110 forming an outer shell of the headlamp FL on the front side of the vehicle may include a translucent resin member such as polycarbonate, and may allow the forward irradiation light LB to pass through the outer lens 110 toward the region in front of the vehicle. The cover 120 forming an outer shell on the rear side of the vehicle may include, for example, a metal member or a high-heat-resistant resin member, and may have an opening at a portion on the front side of the vehicle. The outer lens 110 may be fitted to the portion of the cover 120 on the front side of the vehicle in such a manner as to close the opening of the cover 120, and may be fixed to the cover 120 with bolts, for example.

The inner lens 210 may include a convex lens convex toward the front side of the vehicle. For example, a portion of the inner lens 210 on the front side of the vehicle may include a convex surface, and a portion of the inner lens 210 on the rear side of the vehicle may include a substantially flat aspherical lens. The inner lens 210 may cause the forward irradiation light LB from the light source 220 to irradiate the region in front of the vehicle, and may include a transparent member such as a resin or glass. Examples of the resin may include an acrylic resin and polycarbonate.

The light source 220 may include, for example, a high intensity discharge (HID) lamp, a light emitting diode (LED), or a laser diode (LD) to emit the forward irradiation light LB.

The light-distribution actuator ECU 230 may turn on and off the light source 220 based on data from the light-distribution control ECU 300 to be described later, and may control the direction of the forward irradiation light LB that the headlamp FL of the vehicle emits toward the region in front of the vehicle, by controlling the light source 220 or the driver that changes directions of an unillustrated shade and an unillustrated reflector.

The light-distribution control ECU 300 and a power supply, for example, may be coupled to the light-distribution actuator ECU 230. Data necessary for the light-distribution actuator ECU 230 may be transmitted and received via the CAN bus CB.

Configuration of Light-Distribution Control ECU 300

Figure 4:
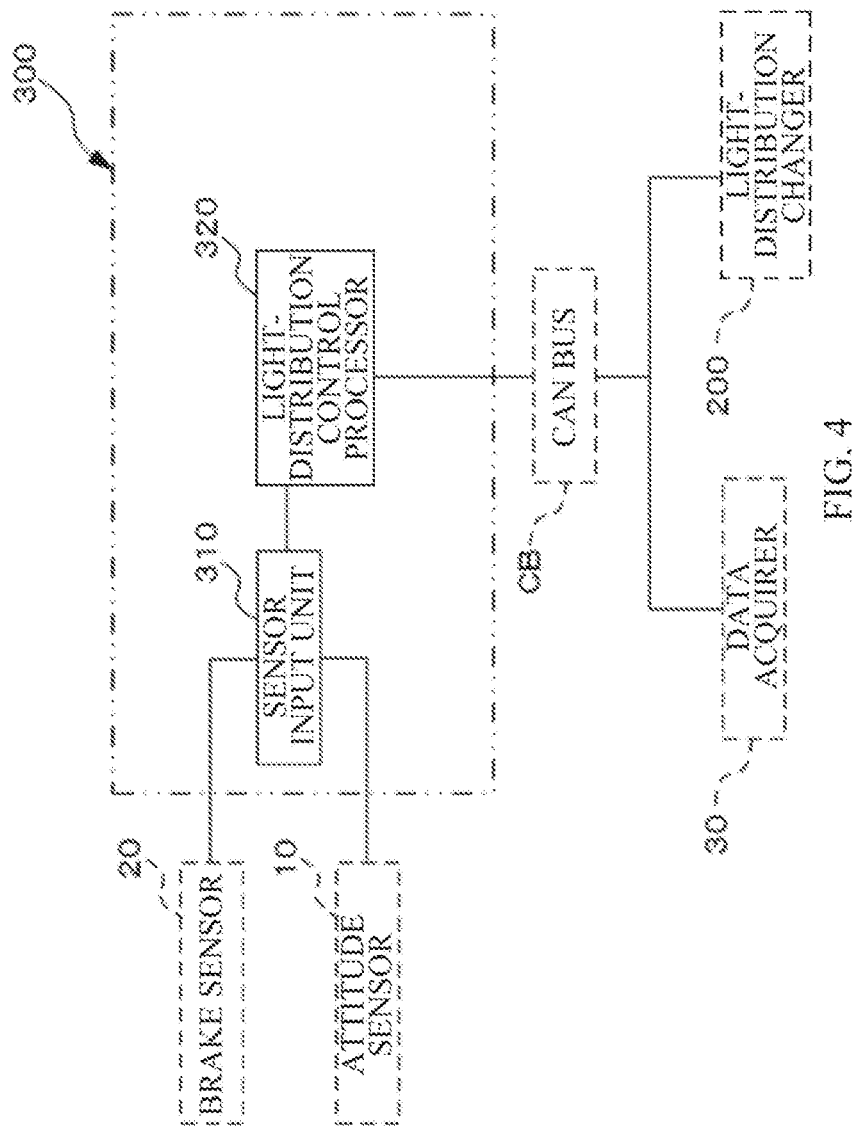
FIG. 4 is a configuration diagram of a light-distribution control ECU of the light-distribution control apparatus illustrated in FIG. 1.

As illustrated in FIG. 4, the light-distribution control ECU 300 may include a sensor input unit 310 and a light-distribution control processor 320.

The attitude sensor 10, the brake sensor 20, and the light-distribution changer 200 may be coupled to the light-distribution control ECU 300. Further, the data acquirer 300 and the light-distribution changer 200 may be coupled to the light-distribution control ECU 300 via the CAN bus CB.

The sensor input unit 310 may acquire the attitude data on the vehicle from the attitude sensor 10. Further, the sensor input unit 310 may acquire the internal pressure data on the brake from the brake sensor 20. The sensor input unit 310 may transmit the acquired data to the light-distribution control processor 320.

The light-distribution control processor 320 may include an unillustrated storage including, without limitation, a read-only memory (ROM) and a random-access memory (RAM). The ROM may hold a control program, for example. The RAM may hold various kinds of data, for example. The light-distribution control processor 320 may perform overall control on the light-distribution control apparatus 1 in accordance with the control program stored in the ROM. The ROM may further hold a normal braking value NP and an emergency braking value EP. In one embodiment, the normal braking value NP may serve as a "first predetermined value" of the internal pressure data on the brake, and the emergency braking value EP may serve as a "second predetermined value" of the internal pressure data on the brake.

Further, the light-distribution control processor 320 controls the light-distribution changer 200 based on one or more pieces of the respective data acquired from the data acquirer 30, the attitude sensor 10, and the brake sensor 20.

When the internal pressure data on the brake is less than or equal to the normal braking value NP, the light-distribution control processor 320 determines that the brake is in a brake mode of "normal braking", and controls the light-distribution changer 200 based on the respective data acquired from the data acquirer 30 and the attitude sensor 10. When the internal pressure data on the brake is greater than the normal braking value NP and less than the emergency braking value EP, the light-distribution control processor 320 determines that the brake is in a brake mode of "sudden braking", and controls the light-distribution changer 200 based on the respective data acquired from the data acquirer 30, the attitude sensor 10, and the brake sensor 20. When the internal pressure data on the brake is greater than or equal to the emergency braking value EP, the light-distribution control processor 320 determines that the brake is in a brake mode of "emergency braking", and controls the light-distribution changer 200 based on the data acquired from the brake sensor 20.

In one example, the light-distribution control processor 320 may acquire data such as traveling speed data on the vehicle from the data acquirer 30 via the CAN bus CB and determine whether the vehicle is traveling. When the vehicle is traveling and the headlamp FL is on, the light-distribution control processor 320 may acquire the attitude data on the vehicle and the internal pressure data on the brake respectively from the attitude sensor 10 and the brake sensor 20, and may control distribution of the light from the headlamp FL via the light-distribution actuator ECU 230.

For example, when the brake is operated in the vehicle and the vehicle thus leans forward, the light-distribution control processor 320 may calculate a forward-leaning angle of the vehicle based on vehicle height data from the attitude sensor 10, and may perform control of increasing a light-distribution angle. Alternatively, the light-distribution control processor 320 may calculate the forward-leaning angle of the vehicle based on the traveling speed data and acceleration data on the vehicle from the data acquirer 30 and the internal pressure data on the brake from the brake sensor 20, and may perform control of increasing or decreasing the light-distribution angle.

Further, the light-distribution control processor 320 may determine the brake mode.

As illustrated in FIG. 5, the brake mode may be classified into four modes of "no braking", "normal braking", "sudden braking", and "emergency braking", based on the internal pressure data on the brake, for example. For example, the brake mode may be classified based on the normal braking value NP and the emergency braking value EP. The normal braking value NP may be set to a value "40" of the internal pressure data on the brake. The emergency braking value EP may be set to a value "80" of the internal pressure data on the brake.

In one example, when the internal pressure data on the brake is "0", the light-distribution control processor 320 may determine that the brake mode is "no braking". When the internal pressure data on the brake is "greater than 0 and less than or equal to 40", the light-distribution control processor 320 may determine that the brake mode is "normal braking". When the internal pressure data on the brake is "greater than 40 and less than 80", the light-distribution control processor 320 may determine that the brake mode is "sudden braking". When the internal pressure data on the brake is "greater than or equal to 80", the light-distribution control processor 320 may determine that the brake mode is "emergency braking". In other words, the brake mode of "normal braking" indicates that the internal pressure data on the brake is less than or equal to the normal braking value NP, the brake mode of "sudden braking" indicates that the internal pressure data on the brake is greater than the normal braking value NP and less than the emergency braking value EP, and the brake mode of "emergency braking" indicates that the internal pressure data on the brake is greater than or equal to the emergency braking value EP.

When the light-distribution control processor 320 determines that the brake mode is "normal braking", the light-distribution control processor 320 may acquire data including the traveling speed data on the vehicle, inclination data on the road surface, and the attitude data on the vehicle from the data acquirer 30 and the attitude sensor 10. The light-distribution control processor 320 may calculate light-distribution control data based on the acquired data and control the light-distribution changer 200. When the light-distribution control processor 320 determines that the brake mode is "sudden braking", the light-distribution control processor 320 may acquire data including the traveling speed data on the vehicle, the inclination data on the road surface, the attitude data on the vehicle, and the internal pressure data on the brake from the data acquirer 30, the attitude sensor 10, and the brake sensor 20. The light-distribution control processor 320 may calculate the light-distribution control data based on the acquired data and control the light-distribution changer 200. When the light-distribution control processor 320 determines that the brake mode is "emergency braking", the light-distribution control processor 320 may acquire the internal pressure data on the brake from the brake sensor 20. The light-distribution control processor 320 may calculate the light-distribution control data based on the acquired data and control the light-distribution changer 200.

Figure 6:
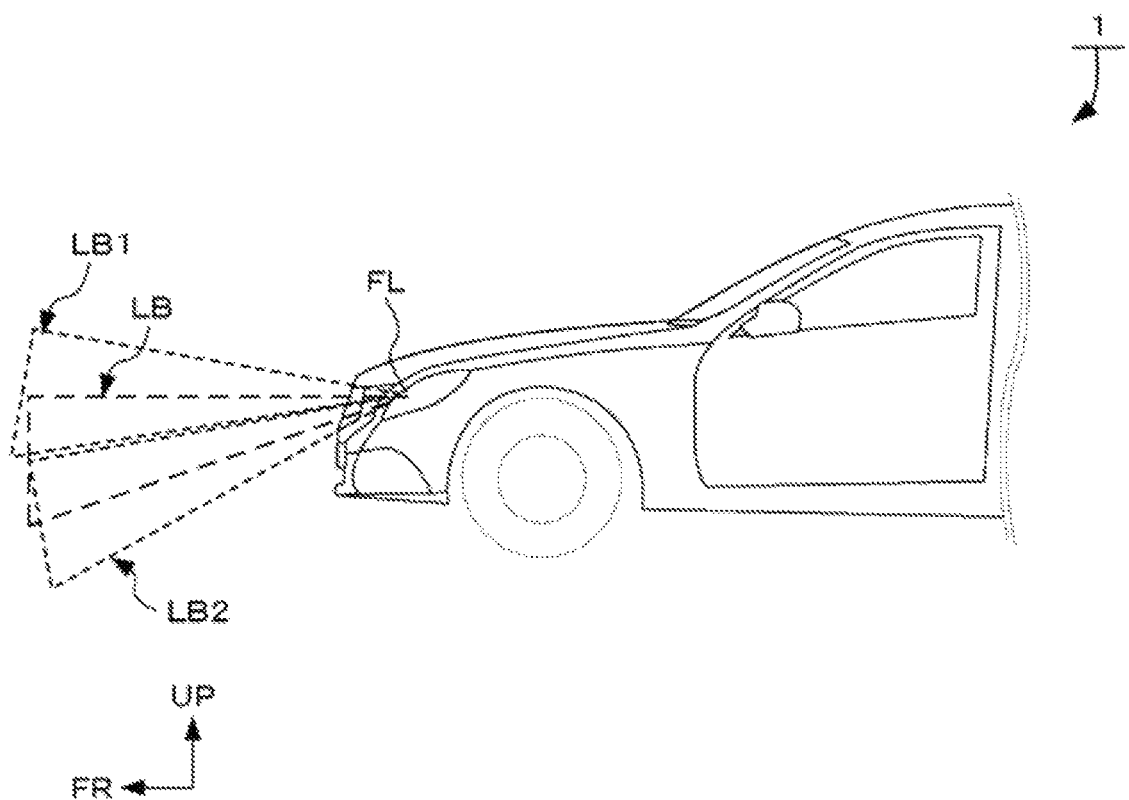
FIG. 6 is a side diagram illustrating light-distribution directions to be controlled by the light-distribution control apparatus illustrated in FIG. 1.

When the brake mode of the vehicle switches to "emergency braking", a housing in which the attitude sensor 10 or the brake sensor 20 is contained or any sensor component itself will undergo high acceleration. At this time, distortion can occur on the housing in which the attitude sensor 10 or the brake sensor 20 is contained or on any sensor component, which can result in distortion data being added to the attitude data on the vehicle or the internal pressure data on the brake that the light-distribution control processor 320 acquires. Due to the addition of the distortion data, as illustrated in FIG. 6, misalignment of the light-distribution position can occur in the up-down direction, as represented by forward irradiation light LB1 or LB2.

To address this, when the brake mode of the vehicle switches to "emergency braking", the light-distribution control processor 320 may acquire, for example, the speed data on the vehicle from the data acquirer 30 and the internal pressure data on the brake from the brake sensor 20 to calculate, for example, a negative acceleration of the vehicle, and may control the light-distribution changer 200 based on the calculated data. Alternatively, for example, a light-distribution control value corresponding to a relevant internal pressure of the brake may be extracted from an unillustrated correspondence table stored in advance in the storage, and the light-distribution changer 200 may be controlled based on such a control value.

When the internal pressure data on the brake is less than or equal to the normal braking value NP, the light-distribution control processor 320 may acquire a light-distribution control value of the light-distribution changer 200 as a reference light-distribution control value SV, or a first light-distribution control value, and may store the reference light-distribution control value SV in the storage. If the internal pressure data on the brake reaches a value greater than or equal to the emergency braking value EP and thereafter returns to a value less than the emergency braking value EP, the light-distribution control processor 320 may control the light-distribution changer 200 based on the reference light-distribution control value SV.

Further, when the brake mode is "no braking" which indicates that the brake is unoperated, the light-distribution control processor 320 may acquire the control value of the light-distribution changer 200 as a traveling light-distribution control value RV, or a second light-distribution control value, and may store the traveling light-distribution control value RV in the storage. If the internal pressure data on the brake reaches a value greater than or equal to the emergency braking value EP and thereafter the vehicle is stopped, the light-distribution control processor 320 may control the light-distribution changer 200 based on the traveling light-distribution control value RV.

In other words, if the brake mode of the vehicle switches to "emergency braking" and thereafter returns to "sudden braking" or "normal braking", the light-distribution control processor 320 may control the light-distribution changer 200 based on the reference light-distribution control value SV including no distortion data. Further, if the brake mode of the vehicle switches to "emergency braking" and thereafter the vehicle is stopped, the light-distribution control processor 320 may control the light-distribution changer 200 based on the traveling light-distribution control value RV including no distortion data.

Process Performed by Light-Distribution Control ECU 300

A process to be performed by the light-distribution control ECU 300 of the light-distribution control apparatus 1 according to the example embodiment will be described with reference to FIGS. 7 to 10.

Figure 7:
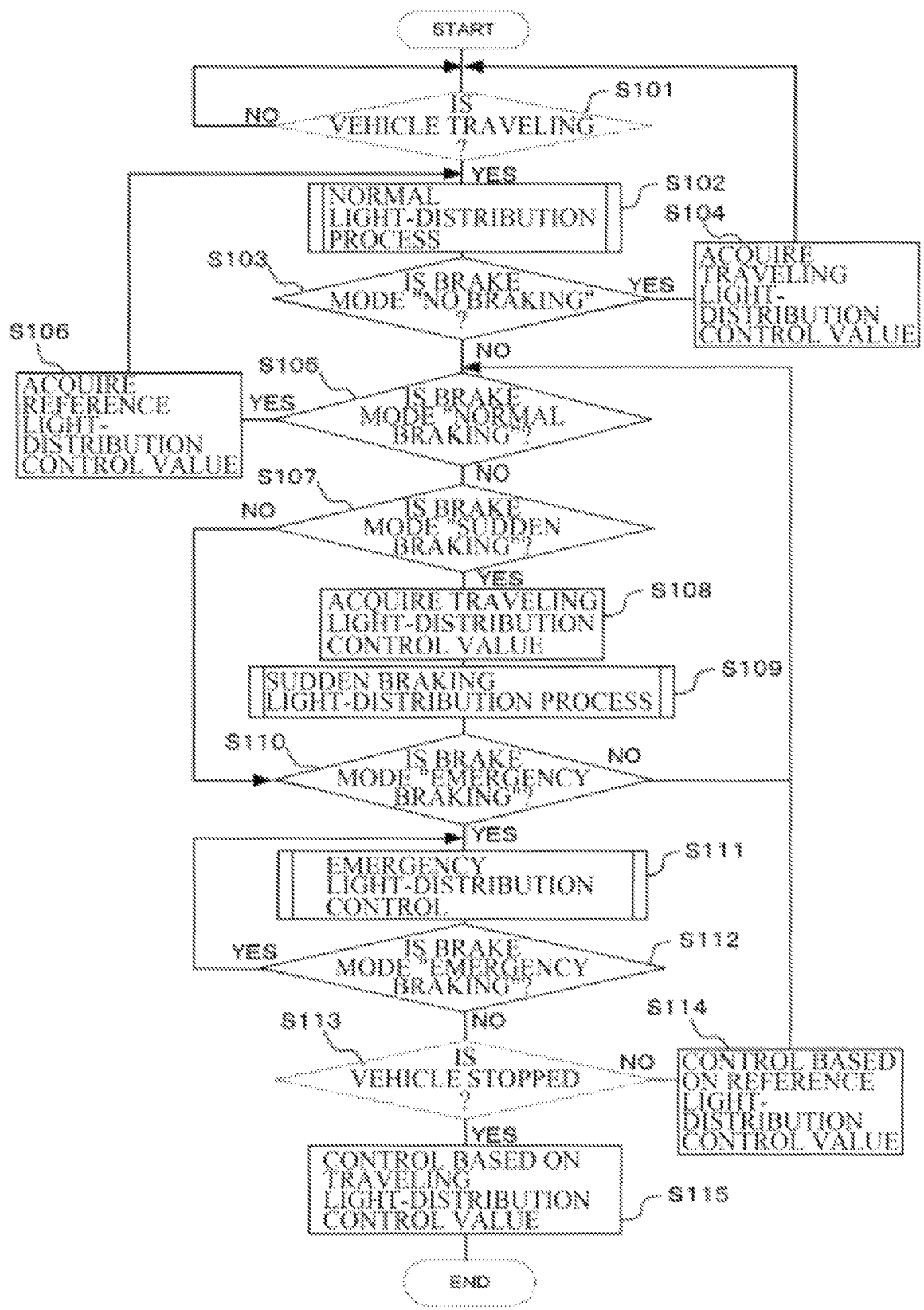
FIG. 7 is a flowchart of a process to be performed by the light-distribution control ECU illustrated in FIG. 4.

As illustrated in FIG. 7, the light-distribution control processor 320 may determine whether the vehicle is traveling (step S101), based on data from the data acquirer 30.

If the light-distribution control processor 320 determines that the vehicle is not traveling ("NO" in step S101), the light-distribution control processor 320 may cause the process to proceed to S101.

If the light-distribution control processor 320 determines that the vehicle is traveling ("YES" in step S101), the light-distribution control processor 320 may execute a normal light-distribution process (step S102). Details of the process of step S102 will be described later.

Thereafter, the light-distribution control processor 320 may determine whether the brake mode is "no braking" (step S103).

If the light-distribution control processor 320 determines that the brake mode is "no braking" ("YES" in step S103), the light-distribution control processor 320 may store the current light-distribution control data in the light-distribution control processor 320 as the traveling light-distribution control value RV, and may cause the process to proceed to step S101 (step S104).

If the light-distribution control processor 320 determines that the brake mode is not "no braking" ("NO" in step S103), the light-distribution control processor 320 may determine whether the brake mode is "normal braking" (step S105).

If the light-distribution control processor 320 determines that the brake mode is "normal braking" ("YES" in step S105), the light-distribution control processor 320 may store the current light-distribution control data in the light-distribution control processor 320 as the reference light-distribution control value SV, and may cause the process to proceed to step S102 (step S106).

If the light-distribution control processor 320 determines that the brake mode is not "normal braking" ("NO" in step S105), the light-distribution control processor 320 may determine whether the brake mode is "sudden braking" (step S107).

If the light-distribution control processor 320 determines that the brake mode is "sudden braking" ("YES" in step S107), the light-distribution control processor 320 may store the current light-distribution control data in the light-distribution control processor 320 as the traveling light-distribution control value RV (step S108), and may execute a sudden braking light-distribution process (step S109). Details of the process of step S109 will be described later.

If the light-distribution control processor 320 determines that the brake mode is not "sudden braking" ("NO" in step S107), the light-distribution control processor 320 may determine whether the brake mode is "emergency braking" (step S110).

If the light-distribution control processor 320 determines that the brake mode is not "emergency braking" ("NO" in step S110), the light-distribution control processor 320 may cause the process to proceed to step S105.

If the light-distribution control processor 320 determines that the brake mode is "emergency braking" ("YES" in step S110), the light-distribution control processor 320 may execute an emergency light-distribution control (step S111). Details of the process of step S111 will be described later.

Thereafter, the light-distribution control processor 320 may determine again whether the brake mode is "emergency braking" (step S112).

If the light-distribution control processor 320 determines that the brake mode is "emergency braking" ("YES" in step S112), the light-distribution control processor 320 may cause the process to proceed to step S111.

If the light-distribution control processor 320 determines that the brake mode is not "emergency braking" ("NO" in step S112), the light-distribution control processor 320 may determine whether the vehicle is stopped (step S113).

If the light-distribution control processor 320 determines that the vehicle is not stopped ("NO" in step S113), the light-distribution control processor 320 may control the light distribution based on the reference light-distribution control value SV (step S114), and may cause the process to proceed to step S105.

If the light-distribution control processor 320 determines that the vehicle is stopped ("YES" in step S113), the light-distribution control processor 320 may control the light distribution based on the traveling light-distribution control value RV (step S115), and may cause the process to end.

Normal Light-Distribution Process

Figure 8:
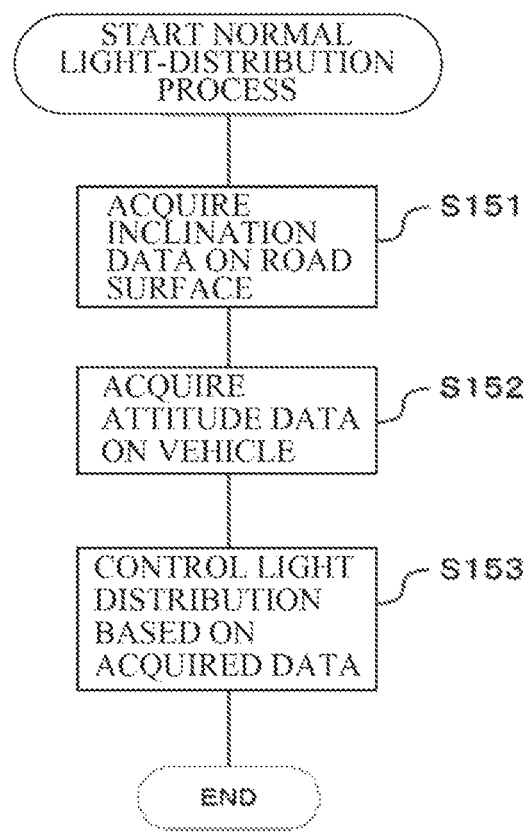
FIG. 8 is a flowchart of a normal light-distribution process to be performed by the light-distribution control ECU illustrated in FIG. 4.

The normal light-distribution process will be described with reference to FIG. 8.

In the normal light-distribution process of step S102, the light-distribution control processor 320 may acquire the inclination data on the road surface from the data acquirer 30 (step S151), and acquire the attitude data on the vehicle from the attitude sensor 10 (step S152). Thereafter, the light-distribution control processor 320 may control the light distribution based on the inclination data on the road surface and the attitude data on the vehicle (step S153), and may cause the process to proceed to step S103.

Sudden Braking Light-Distribution Process

Figure 9:
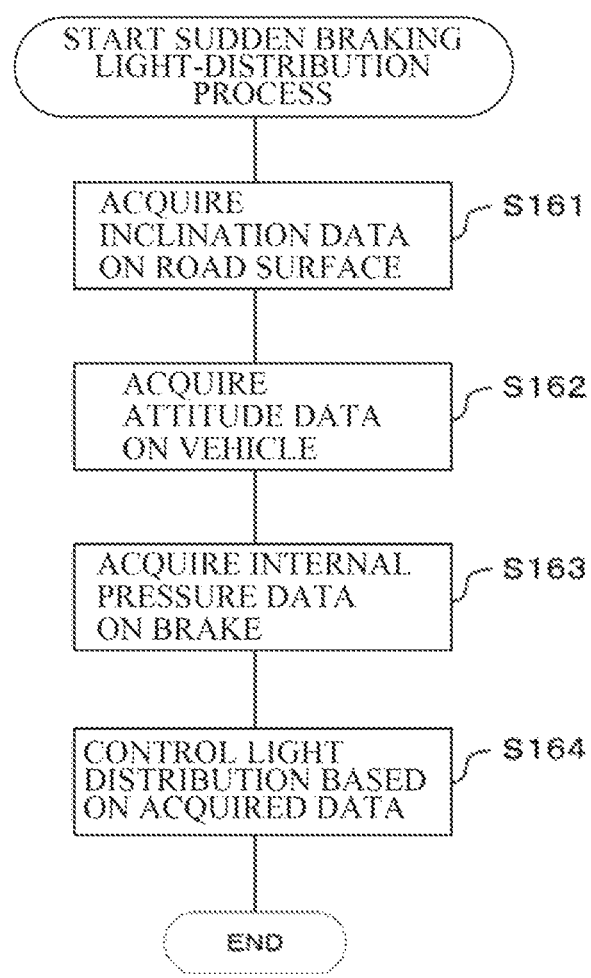
FIG. 9 is a flowchart of a sudden braking light-distribution process to be performed by the light-distribution control ECU illustrated in FIG. 4.

The sudden braking light-distribution process will be described with reference to FIG. 9.

In the sudden braking light-distribution process of step S109, the light-distribution control processor 320 may acquire the inclination data on the road surface from the data acquirer 30 (step S161), acquire the attitude data on the vehicle from the attitude sensor 10 (step S162), and acquire the internal pressure data on the brake from the brake sensor 20 (step S163). Thereafter, the light-distribution control processor 320 may control the light distribution based on the inclination data on the road surface, the attitude data on the vehicle, and the internal pressure data on the brake (step S164), and may cause the process to proceed to step S110.

Emergency Light-Distribution Process

Figure 10:
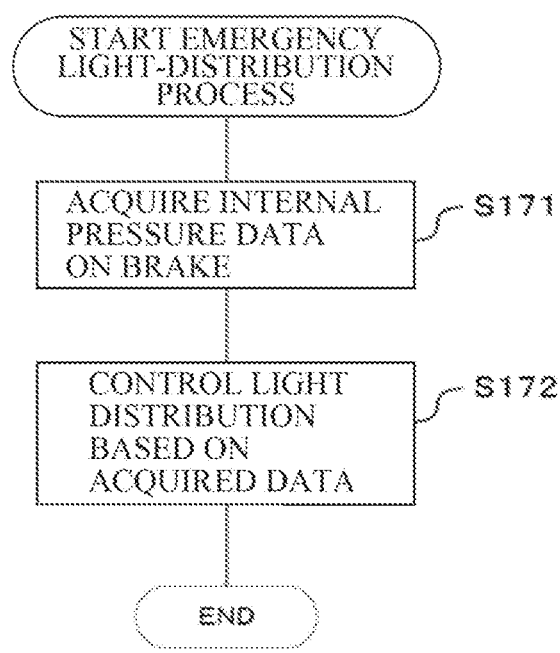
FIG. 10 is a flowchart of an emergency light-distribution process to be performed by the light-distribution control ECU illustrated in FIG. 4.

The emergency light-distribution process will be described with reference to FIG. 10.

In the emergency light-distribution control of step S111, the light-distribution control processor 320 may acquire the internal pressure data on the brake from the brake sensor 20 (step S171). Thereafter, the light-distribution control processor 320 may control the light distribution based on the internal pressure data on the brake (step S172). Thereafter, the light-distribution control processor 320 may cause the process to proceed to step S112.

Workings and Example Effects

As described hereinabove, the light-distribution control apparatus 1 according to the example embodiment includes the light-distribution changer 200, the data acquirer 30, the attitude sensor 10, the brake sensor 20, and the light-distribution control processor 320. The light-distribution changer 200 changes distribution of the light that the headlamp FL of the vehicle emits toward the region in front of the vehicle. The data acquirer 30 recognizes the traveling state or the traveling environment of the vehicle and acquires inclination data on an object approaching the vehicle and on the road surface on which the vehicle is traveling. The attitude sensor 10 acquires attitude data on the vehicle. The brake sensor 20 acquires internal pressure data on the brake of the vehicle. The light-distribution control processor 320 controls the light-distribution changer 200 based on one or more pieces of the inclination data acquired from the data acquirer 30, the attitude data acquired from the attitude sensor 10, and the internal pressure data on the brake acquired from the brake sensor 20. When the internal pressure data on the brake is less than or equal to the normal braking value NP as the first predetermined value, the light-distribution control processor 320 controls the light-distribution changer 200 based on the inclination data and the attitude data. When the internal pressure data on the brake is greater than the normal braking value NP and less than the emergency braking value EP as the second predetermined value, the light-distribution control processor 320 controls the light-distribution changer 200 based on the inclination data, the attitude data, and the internal pressure data on the brake. When the internal pressure data on the brake is greater than or equal to the emergency braking value EP, the light-distribution control processor 320 controls the light-distribution changer 200 based on the internal pressure data on the brake.

For example, when the vehicle is traveling and the headlamp FL is on, the light-distribution control processor 320 of the light-distribution control ECU 300 may determine whether the brake mode as the internal pressure data on the brake is "normal braking", whether the brake mode is "sudden braking", or whether the brake mode is "emergency braking", and may change data to acquire, based on the brake mode. The light-distribution control processor 320 may thus control the light-distribution changer 200 based on the acquired data. This makes it possible to perform accurate light-distribution control.

When the brake mode switches to "emergency braking", distortion occurring on the housing in which the attitude sensor 10 or the brake sensor 20 is contained or on any sensor component can cause distortion data to be added to the attitude data on the vehicle or the internal pressure data on the brake that is being transmitted. To address this, when the brake mode is "emergency braking", for example, a negative acceleration of the vehicle may be calculated by acquiring speed data on the vehicle from the data acquirer 30 and the internal pressure data on the brake from the brake sensor 20. This makes it possible to control the light distribution of the vehicle based on a light-distribution control value including no distortion data.

Accordingly, it is possible to reduce the occurrence of misalignment of the light-distribution position of the headlamp of the vehicle.

In some embodiments, when the internal pressure data on the brake is less than or equal to the normal braking value NP as the first predetermined value, the light-distribution control processor 320 of the light-distribution control apparatus 1 may acquire the light-distribution control value of the light-distribution changer 200 as the reference light-distribution control value SV, or the first light-distribution control value, and if the internal pressure data on the brake reaches a value greater than or equal to the emergency braking value EP and thereafter returns to a value less than the emergency braking value EP, the light-distribution control processor 320 may control the light-distribution changer 200 based on the reference light-distribution control value SV.

Thus, it is possible for the light-distribution control processor 320 to perform accurate light-distribution control on the vehicle by controlling the light-distribution changer 200 based on the reference light-distribution control value SV that includes no distortion data, not based on any light-distortion control value that includes distortion data resulting from distortion occurring on the housing in which the attitude sensor 10 or the brake sensor 20 is contained or on any sensor component when the brake mode switches to "emergency braking".

Accordingly, it is possible to reduce the occurrence of misalignment of the light-distribution position of the headlamp of the vehicle.

In some embodiments, when the brake is unoperated, the light-distribution control processor 320 of the light-distribution control apparatus 1 may acquire the control value of the light-distribution changer 200 as the traveling light-distribution control value RV, or the second light-distribution control value, and if the internal pressure data on the brake reaches a value greater than or equal to the emergency braking value EP as the second predetermined value and thereafter the vehicle is stopped, the light-distribution control processor 320 may control the light-distribution changer 200 based on the traveling light-distribution control value RV.

Thus, it is possible for the light-distribution control processor 320 to perform accurate light-distribution control on the vehicle by controlling the light-distribution changer 200 based on the traveling light-distribution control value RV that includes no distortion data, not based on any light-distortion control value that includes distortion data resulting from distortion occurring on the housing in which the attitude sensor 10 or the brake sensor 20 is contained or on any sensor component when the brake mode switches to "emergency braking".

Accordingly, it is possible to reduce the occurrence of misalignment of the light-distribution position of the headlamp of the vehicle.

It is possible to implement the light-distribution control apparatus 1 of the example embodiment of the disclosure by recording the process to be executed by the light-distribution control ECU 300 on a non-transitory recording medium readable by a computer system, and causing the computer system to load the program recorded on the non-transitory recording medium onto the light-distribution control ECU 300 to execute the program. The computer system as used herein may encompass an operating system (OS) and hardware such as a peripheral device.

In addition, when the computer system utilizes a World Wide Web (WWW) system, the "computer system" may encompass a website providing environment (or a website displaying environment). The program may be transmitted from a computer system that contains the program in a storage device or the like to another computer system via a transmission medium or by a carrier wave in a transmission medium. The "transmission medium" that transmits the program may refer to a medium having a capability to transmit data, including a network (e.g., a communication network) such as the Internet and a communication link (e.g., a communication line) such as a telephone line.

Further, the program may be directed to implement a part of the operation described above. The program may be what is called a differential file (differential program) configured to implement the operation by a combination of a program already recorded on the computer system.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

According to at least one embodiment of the disclosure, it is possible to reduce the occurrence of misalignment of the light-distribution position of the headlamp of the vehicle.

One or more pieces of the data acquirer 30, the light-distribution changer 200, and the light-distribution control ECU 300 illustrated in FIG. 2 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of one or more pieces of the data acquirer 30, the light-distribution changer 200, and the light-distribution control ECU 300. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of one or more pieces of the data acquirer 30, the light-distribution changer 200, and the light-distribution control ECU 300 illustrated in FIG. 2.

The invention claimed is:

1. A light-distribution control apparatus to be applied to a vehicle, the light-distribution control apparatus comprising:
a light-distribution changer configured to change distribution of light that is emitted from a headlamp of the vehicle toward a region in front of the vehicle;
a data acquirer configured to recognize a traveling state or a traveling environment of the vehicle and acquire inclination data on inclination of a road surface on which the vehicle is traveling;
an attitude sensor configured to acquire attitude data on the vehicle;
a brake sensor configured to acquire internal pressure data on a brake of the vehicle; and
a light-distribution control processor configured to control the light-distribution changer based on one or more pieces of the inclination data acquired from the data acquirer, the attitude data acquired from the attitude sensor, and the internal pressure data acquired from the brake sensor,
wherein the light-distribution control processor is configured to:
when the internal pressure data is less than or equal to a first predetermined value, control the light-distribution changer to change an angle of the light from the headlamp upwards or downwards based on first information including the inclination data and the attitude data;

when the internal pressure data is greater than the first predetermined value and less than a second predetermined value, control the light-distribution changer to change the angle of the light from the headlamp upwards or downwards based on a second information including the inclination data, the attitude data, and the internal pressure data; and
when the internal pressure data is greater than or equal to the second predetermined value, control the light-distribution changer to change the angle of the light from the headlamp upwards or downwards based on third information including the internal pressure data, the third information not including the attitude data.

2. The light-distribution control apparatus according to claim 1, wherein the light-distribution control processor is configured to
when the internal pressure data is less than or equal to the first predetermined value, acquire a light-distribution control value of the light-distribution changer as a first light-distribution control value, and
control the light-distribution changer based on the first light-distribution control value when the internal pressure data returns to a value less than the second predetermined value after the internal pressure data reaches a value greater than or equal to the second predetermined value.

3. The light-distribution control apparatus according to claim 2, wherein the light-distribution control processor is configured to
when the brake is unoperated, acquire the light-distribution control value of the light-distribution changer as a second light-distribution control value, and
control the light-distribution changer based on the second light-distribution control value when the vehicle is stopped after the internal pressure data reaches the value greater than or equal to the second predetermined value.

4. A light-distribution control apparatus to be applied to a vehicle, the light-distribution control apparatus comprising
an attitude sensor configured to acquire attitude data on the vehicle,
a brake sensor configured to acquire internal pressure data on a brake of the vehicle, and
circuitry configured to:
change distribution of light that is emitted from a headlamp of the vehicle toward a region in front of the vehicle;
recognize a traveling state or a traveling environment of the vehicle and acquire inclination data on inclination of a road surface on which the vehicle is traveling; and
control the distribution of the light based on one or more pieces of the inclination data, the attitude data acquired from the attitude sensor, and the internal pressure data acquired from the brake sensor,
wherein the circuitry is configured to:
when the internal pressure data is less than or equal to a first predetermined value, control the distribution of the light to change an angle of the light from the headlamp upwards or downwards based on first information including the inclination data and the attitude data;
when the internal pressure data is greater than the first predetermined value and less than a second predetermined value, control the distribution of the light to change the angle of the light from the headlamp upwards or downwards based on second information including the inclination data, the attitude data, and the internal pressure data; and when the internal pressure data is greater than or equal to the second predetermined value, control the distribution of the light to change the angle of the light from the headlamp upwards or downwards based on third information including the internal pressure data, the third information not including the attitude data.

5. The light-distribution control apparatus according to claim 4, wherein the circuitry is configured to:

when the internal pressure data is less than or equal to the first predetermined value, acquire a light-distribution control value indicating the angle of the light from the headlamp as a first light-distribution control value; and control the light-distribution of the light based on the first light-distribution control value when the internal pressure data returns to a value less than the second predetermined value after the internal pressure data reaches a value greater than or equal to the second predetermined value.

6. The light-distribution control apparatus according to claim 5, wherein the circuitry is configured to:

when the brake is unoperated, acquire the light-distribution control value as a second light-distribution control value, and control the light-distribution of the light based on the second light-distribution control value when the vehicle is stopped after the internal pressure data reaches the value greater than or equal to the second predetermined value.

\* \* \* \* \*